Sept. 20, 1971        J. W. LEWIS        3,606,380

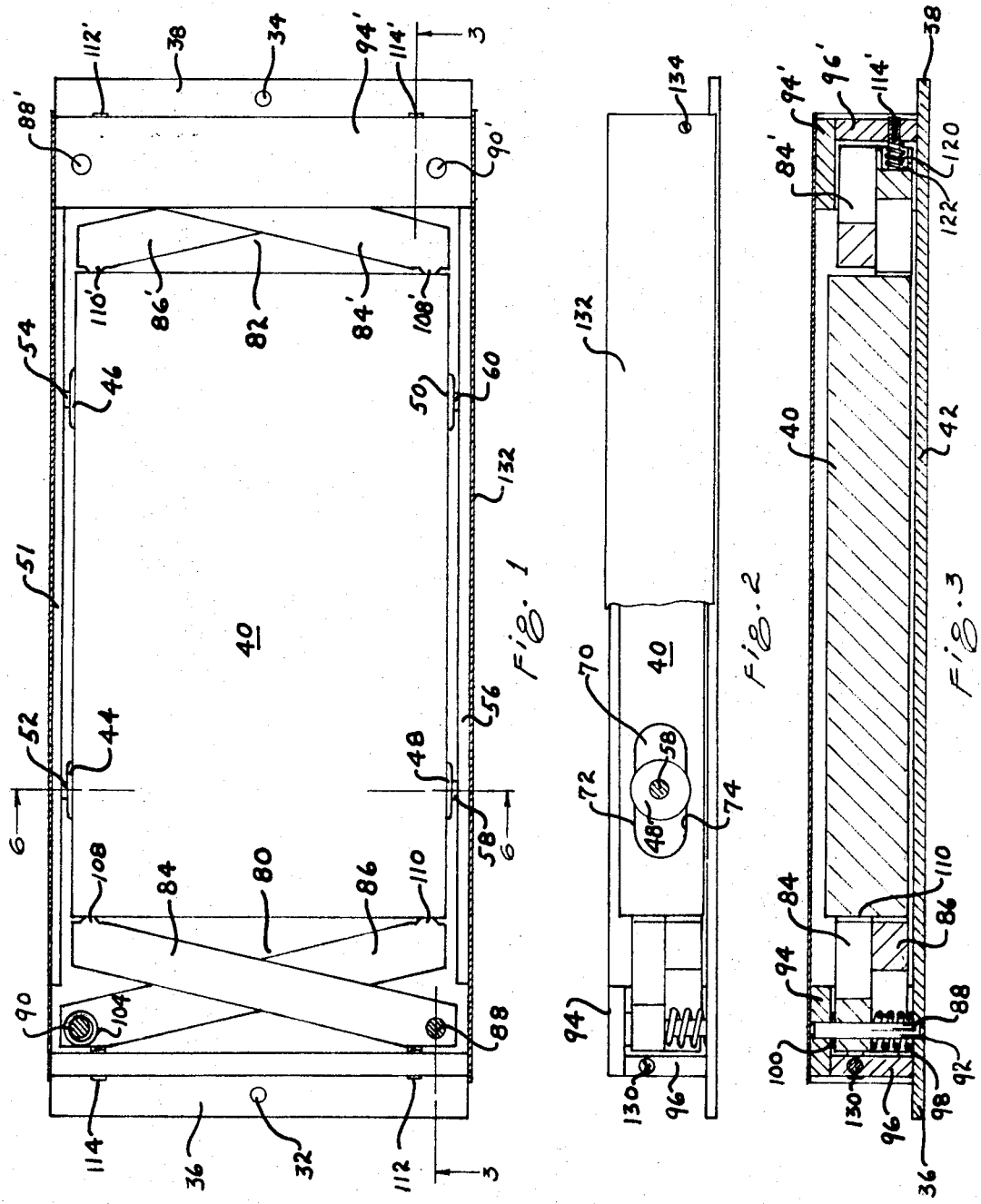

VEHICLE STABILIZING DEVICE

Filed Nov. 24, 1969        2 Sheets-Sheet 2

*INVENTOR.*
JAMES W. LEWIS

BY Hobbs & Green

ATTORNEYS

United States Patent Office 3,606,380
Patented Sept. 20, 1971

3,606,380
VEHICLE STABILIZING DEVICE
James W. Lewis, 218 Barber St.,
Edwardsburg, Mich. 49112
Filed Nov. 24, 1969, Ser. No. 879,444
Int. Cl. B60r 27/00
U.S. Cl. 280—150D
8 Claims

ABSTRACT OF THE DISCLOSURE

A vehicle stabilizing device in which a weight is mounted on a base for linear reciprocating movement in response to rear end centrifugal forces of the vehicle. A resilient means including two crossed levers pivotally connected to the base at each end of the weight transmits the counteracting forces of the weight to the base and thence to the vehicle. Springs may be interposed between the levers and base or between the weight and levers to enhance the resiliency of the reacting lever means.

In recent years high powered engines have been used in relatively light automobiles, such as sports cars and racing stock cars, and during rapid acceleration either from standing still or as the vehicle negotiates a curve, there is a marked tendency for the rear end of the vehicle to pivot laterally with respect to the front wheels, sometimes resulting in uncontrollable skidding and accidents. The rear end skidding may be more pronounced or accentuated under certain road conditions, such as on icy or wet pavements, or with worn tires on which the tread is no longer effective in gripping the pavement surface. Various types of devices have been used and tried in the past for stabilizing the vehicle and minimizing rear end skidding, sometimes referred to as centrifugal skidding, but these prior devices have had a number of inherent objections or disadvantages, such as instability, excessive weight and size, or utilization of otherwise needed space in the vehicle trunk, or they have been of a character such that they were difficult to install, maintain and operate without interfering with the normal use of the vehicle. It is, therefore, one of the principal objects of the present invention to provide a relatively simple, compact device for assisting in the control of the vehicle under side swaying and rear end skidding conditions, which can easily be installed in or under the trunk of an automobile without appreciably interfering with the use of the trunk and without using any otherwise usable space, and which gives the driver of the vehicle effective control over the car in preventing and controlling rear end skidding without changing significantly the normal operation and control of the car.

Another object of the invention is to provide an automobile stabilizing mechanism for preventing or minimizing centrifugal rear end skidding, i.e. to one side or the other, and for giving the driver greater control during normal driving conditions as well as during hazardous driving conditions, without producing any adverse counterreaction or creating any appreciable excess weight in the automobile.

When an automobile turns a relatively sharp corner at a relatively high speed, substantial centrifugal forces are created which render the vehicle difficult to control and which may cause the rear end to swerve outwardly and skid out of control. This same sidewise skidding may also occur as the brakes are applied rapidly. The present device not only counteracts these adverse conditions by counteracting the centrifugal forces, but also gives the vehicle greater traction and reduces the tendency of the vehicle to roll or rock or initiate skidding or whipping action.

The present vehicle stabilizing device involves a horizontally positioned elongated weight movable laterally relative to the vehicle as the vehicle swings to one side or the other to counteract the centrifugal forces resulting from the lateral swinging action of the vehicle. One of the particular advantages of the present device is its compact, low silhouette construction achieved in part by the direct longitudinal movement of the operating weight in the device and the application of the forces of the weight during the swinging movement of the vehicle against moment arms through which the weight forces are applied to the vehicle. This permits effective and optimum action of the operating weight with maximum stability, while maintaining the unit at a size and shape which permits it to be easily installed without interfering with the otherwise usable space in the vehicle.

Further objects and advantages of the invention will become apparent from the following description and accompanying drawings, wherein:

FIG. 1 is a top plan view of the mechanism with a portion of the top and frame shown in cross section to better illustrate the construction and operation of the present vehicle stabilizer;

FIG. 2 is a side elevational view of the housing and a portion of the internal mechanism;

FIG. 3 is a longitudinal cross sectional view of the vehicle stabilizer, the section being taken on line 3—3 of FIG. 1;

Figure 4:
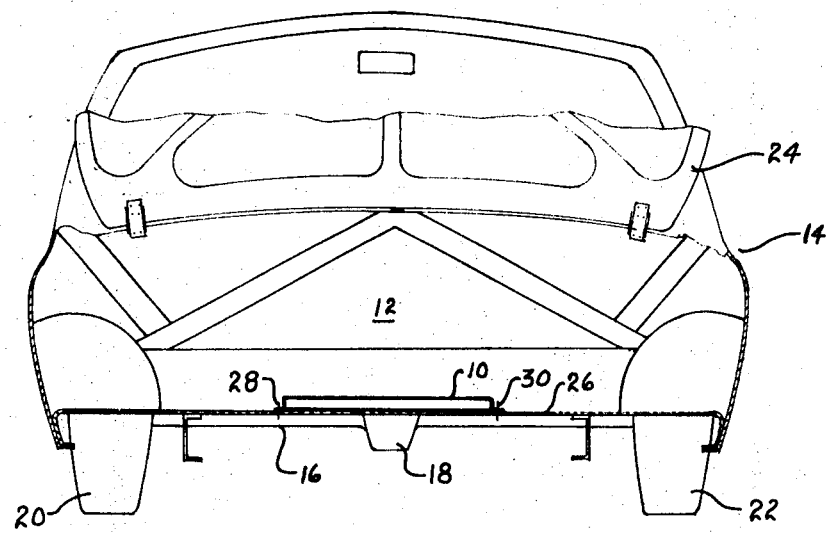
FIG. 4 is a vertical transverse cross sectional view through a standard automobile showing the present stabilizing device mounted therein.
Figure 5:
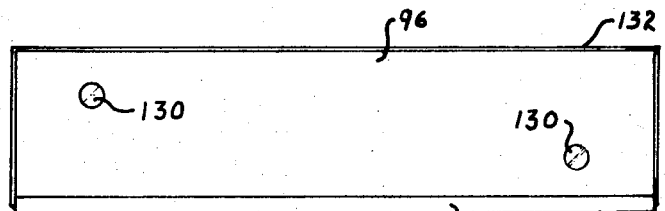
FIG. 5 is an end elevational view of the present device.

Referring more specifically to the drawings, numeral 10 designates generally the present device mounted in a trunk 12 of a conventional automobile 14, the automobile having a rear axle 16, differential 18 and real wheels 20 and 22. The trunk lid 24 is shown in open position with a portion thereof broken away. The present device is shown mounted on floor 26 of the trunk, and it may be mounted in other positions in the car. However, it is preferable to mount the device in the longitudinal center of the car and rearwardly of the rear axle as illustrated in FIG. 4. The device is held firmly on the trunk floor by screws 28 and 30 extending downwardly through holes 32 and 34 in end flanges 36 and 38, respectively.

Figure 6:
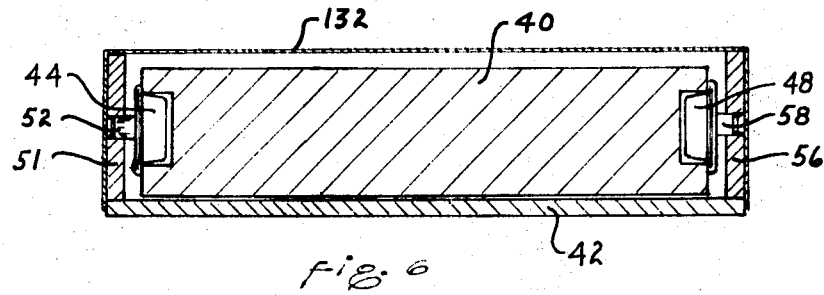
FIG. 6 is a vertical transverse cross sectional view of the device, the section being taken on line 6—6 of FIG. 1.

A weight 40 of steel, cast iron, lead or other suitable heavy material of rectangular configuration is mounted on base 42 by four rollers 44, 46, 48 and 50, rollers 44 and 46 being supported on side frame 51 by pins or studs 52 and 54, respectively, and rollers 48 and 50 being mounted on side frame 56 by pins or studs 58 and 60, respectively. The side frames 51 and 56 are joined rigidly to base 42 by welding or other suitable securing means in the upright position illustrated in FIG. 6. The rollers are seated in recesses 70, the upper and lower edges 72 and 74 of which form upper and lower tracks for the respective rollers to permit the weight to move freely longitudinally relative to base 42 and frame members 51 and 56, as the rear end of the vehicle moves from side to side. While four rollers are shown in the drawings, three rollers, i.e. two on one side and one on the other side, may be used if desired, or a greater number of rollers may be used, with corresponding recesses 70 in weight 40. The weight is held suspended or in spaced relation above base 42 as illustrated in FIG. 6 so that the weight may move freely without interference from the base.

While the preferred form of mounting the weight in the housing is illustrated in the drawings, as an alternative, the rollers may be mounted on the weight and adapted to run on tracks along each side, either in or supported by frame members 51 and 56.

The action of weight 40 is transmitted to the vehicle by mechanisms 80 and 82 at the opposite ends of the weight. The two mechanisms are the same in construction and operation and hence only one will be described in detail herein with primes being given to the numerals of corresponding parts in the other mechanism. Mechanism 80 consists of two arms or levers 84 and 86, the former being pivotally mounted on base 42 by pin 88 and the latter being pivotally mounted on the base by pin 90. The lower ends of the pins are seated in holes 92 and rigidly held therein and the upper ends of the pins are supported by transverse upper member 94 and an end member 96. The two members 94 and 96 are preferably joined together by welding or formed integrally, and member 96 is preferably rigidly secured to base 42 by welding or other suitable securing means. Lever 84 is held in its upper position by a spring 98 disposed around pin 88 and reacting between the base and the underside of arm 84. An anti-friction washer 100 is preferably disposed between the upper surface of lever 84 and the under surface of member 94. Lever 86 is preferably held in its lower position by a spring 104 disposed around pin 90 and reacting between the upper side of lever 86 and the underside of member 94. An anti-friction washer similar to washer 100 is preferably disposed between the underside of lever 86 and base 42.

The two levers 84 and 86 are operably connected to weight 40 by projections 108 and 110 respectively, the two projections being adapted to receive the action of weight 40 and to slide laterally a slight amount as force is applied by the weight to the two levers. The action of the weight applied to the levers is transmitted to member 96 through abutment screws 112 and 114, respectively, and since the two screws are spaced inwardly from pins 88 and 90, the force applied to the two levers is effectively applied to the screws, which in turn transmits the pressure to transverse member 96. As explained previously, the latter member is joined rigidly by welding or other suitable securing means to the base, which in turn is secured to the vehicle floor or other suitable supporting structure, and hence the force of the weight is transmitted to the vehicle. The two screws 112 and 114 are threadedly disposed in holes extending through member 96 and can be adjusted inwardly and outwardly to adjust the travel and the effectiveness of the action of weight 40 as it moves laterally, i.e. endwise, in response to the centrifugal movement of the rear end of the vehicle. In view of the close proximity of screws 112 and 114 to the pivot pins 88 and 90, the substantial force of weight 40 causes a flexing of arms 84 and 86 when the two arms are seated rigidly against the two screws.

In the embodiment illustrated in the drawings, a spring 120 is seated in a recess 122 in the respective levers 84 and 86 around screws 112 and 114, and initially absorbs the action of the weight before the levers seat on their respective abutment screws. The springs normally permit a greater movement of weight 40 than the construction without the springs which relies primarily on the flexing of levers 84 and 86. Screws 112 and 114 are retained in their adjusted positions by set screws 130 extending inwardly through threaded openings at the respective end of member 96, and after an adjustment has been made, the set screws are tightened to retain the two screws 112 and 114 in their adjusted position. The mechanism and weight are enclosed in a housing 132, which fits snugly over the side frame members 51 and 56 and is secured in place by screws 134 at each end of the housing, the screws extending through the housing into the ends of members 96 and 96'.

In the use and operation of the present vehicle stabilizing device, the device is normally secured to the floor of the trunk rearwardly of the rear axle of the automobile and in the center thereof. In view of its low silhouette and compactness, the device utilizes very little space which is otherwise usable in the trunk or elsewhere in the automobile. As the automobile is driven and rear end side sway conditions prevail, such as during rapid acceleration, fast braking, or negotiating a relatively sharp turn at relatively high speed, weight 40 tends to shift relative to the automobile, i.e. the automobile tends to swing outwardly and weight 40 tends to remain stationary. The difference in relative movement of the automobile and weight 40 causes weight 40 to apply a pressure on the levers on the opposite side of the weight from the direction of the rear end movement. The action of weight 40 on levers 84 and 86 is transmitted to pins 88 and 90 and screws 112 and 114, in turn applying force to member 96. Since member 96 is secured rigidly to base 42, the forces of the weight are transmitted to base 42 which is secured rigidly to the floor 26 of the trunk by pins 28 and 30, thus transmitting a counteraction to the centrifugal forces resulting from the side sway or skidding of the automobile.

Since the weight is immediately responsive to the centrifugal forces of the automobile, the action of the weight immediately minimizes the effect of the centrifugal forces and hence tends to hold the automobile in its proper straight line position and reduces the tendency of the vehicle to skid. When the centrifugal force has been relieved by the movement of the automobile in a straight line, weight 40 assumes its position equally spaced between the two sets of levers 84 and 86 and 84' and 86' without applying any substantial forces to either of the lever combinations. The vehicle is stabilized and the effect of the centrifugal forces on the rear end minimized by the longitudinal movement of weight 40 on rollers 44, 46, 48, and 50. The additional weight afforded by weight 40, which normally ranges from about 40 to 100 pounds depending upon the size and use of the automobile, applies a downward force and hence increases the gripping action of the automobile on the pavement as well as counteracting the centrifugal forces.

Figure 7:
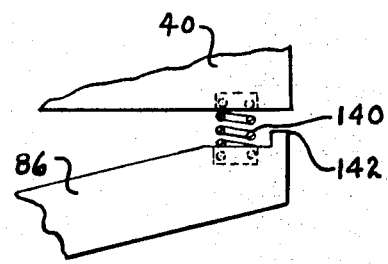
FIG. 7 is an enlarged fragmentary plan view of a modified form of the operating mechanism.

The embodiment of the invention illustrated in FIG. 7 is essentially the same as the embodiment previously described incorporating spring 120. In the embodiment illustrated in FIG. 7, levers 84 and 86 and 84' and 86' are separated from the weight by springs 140 reacting between the end of the respective lever and the end of weight 40. The initial action of the weight is absorbed by the relatively strong spring 140 until the weight contacts abutments 142, after which the flexing of the levers absorbs the forces of the weight.

While only two embodiments of the invention have been described herein, various changes and modifications may be made without departing from the scope of the invention.

I claim:
1. A vehicle stabilizing device comprising a base, a weight means, a support means mounting said weight means on said base for linear reciprocating movement, means for securing said base to a vehicle structure with the weight means in a position to reciprocate transversely with respect to the vehicle, weight means reaction members at each end of said weight means including two crossed levers pivoted at one end to said base and contacting the respective end of said weight means at the other end, and means transmitting the forces of said weight means from said levers near the pivoted end thereof to said base and, together with said levers, forming a resilient connection between said weight means and said base for transmitting the forces of said weight means to the vehicle to counteract the centrifugal forces created by a sidewise movement of the rear end of the vehicle.

2. A vehicle stabilizing device as defined in claim 1, in which said force transmitting means includes an abutment member at said each end, and abutment screws extending through said abutment members and positioned to be contacted by said levers.

3. A vehicle stabilizing device as defined in claim 2 in which a spring is interposed between each of said levers and the respective screws.

4. A vehicle stabilizing device as defined in claim 2 in which a spring is interposed between each of the levers and the respective end of said weight means.

5. A vehicle stabilizing device as defined in claim 1 in which said weight means is generally of a rectangular shape and elongated in the direction transverse to the center line of the vehicle and said support means includes at least one roller on each side thereof to permit free reciprocating movement of the weight means.

6. A vehicle stabilizing device as defined in claim 3 in which said weight means is generally of a rectangular shape and elongated in the direction transverse to the center line of the vehicle and said support means includes at least one roller on each side thereof to permit free reciprocating movement of the weight means.

7. A vehicle stabilizing device as defined in claim 6 in which frame members are disposed along each side of said weight means and said rollers are supported by said frame members and extended into recesses in the sides of said weight means.

8. A vehicle stabilizing device as defined in claim 1 in which said weight means is generally of a rectangular shape with the horizontal length and width dimensions being substantially greater than the vertical dimension.

References Cited
UNITED STATES PATENTS

| | | | |
|---|---|---|---|
| 2,618,492 | 11/1952 | Singer | 280—150D |
| 2,635,891 | 4/1953 | Silverman | 280—150D |
| 2,990,193 | 6/1961 | Heard | 280—150D |

LEO FRIAGLIA, Primary Examiner

R. R. SONG, Assistant Examiner